US012680381B2

(12) United States Patent
Derusso

(10) Patent No.: US 12,680,381 B2
(45) Date of Patent: Jul. 14, 2026

(54) EXPANDABLE STEP SYSTEM

(71) Applicant: Therese Derusso, Evansville, WY (US)

(72) Inventor: Therese Derusso, Evansville, WY (US)

( * ) Notice: Subject to any disclaimer, the term of this patent is extended or adjusted under 35 U.S.C. 154(b) by 390 days.

(21) Appl. No.: 18/511,168

(22) Filed: Nov. 16, 2023

(65) Prior Publication Data

US 2024/0318502 A1 Sep. 26, 2024

Related U.S. Application Data

(60) Provisional application No. 63/491,366, filed on Mar. 21, 2023.

(51) Int. Cl.
*E06C 1/00* (2006.01)
*A47B 77/10* (2006.01)
*E06C 7/00* (2006.01)

(52) U.S. Cl.
CPC ................ *E06C 1/005* (2013.01); *E06C 7/00* (2013.01)

(58) Field of Classification Search
CPC .......... E04F 11/06; E06C 1/005; A47B 77/10; A47B 2220/05; A47C 9/00; A47C 12/00
See application file for complete search history.

(56) References Cited

U.S. PATENT DOCUMENTS 5,005,667 A * 4/1991 Anderson .............. A47B 77/10 182/35
5,094,515 A 3/1992 Low
9,617,788 B2 4/2017 Goodson
2009/0188754 A1* 7/2009 Warren ................... E06C 9/085 182/141
2011/0198154 A1 8/2011 Worley
2012/0086317 A1* 4/2012 Baran .................... A47B 77/10 29/401.1
2014/0111072 A1* 4/2014 Camadella ........... A47B 88/413 312/235.1
2015/0033786 A1* 2/2015 Mansfield .............. A47B 83/00 62/449
2017/0226800 A1* 8/2017 Barry ...................... A47C 12/00
2019/0169930 A1* 6/2019 Niemiec .............. A47B 88/413
2020/0392787 A1* 12/2020 Navarro .................. E06C 1/005

FOREIGN PATENT DOCUMENTS

DE 102007045215 A1 * 4/2009 ............. A47B 77/10
EP 1366692 A2 * 12/2003 ............. A47C 12/02
FR 3020256 A1 * 10/2015 ............. E06C 1/005
WO WO-2015143474 A1 * 10/2015 ............. A47B 97/00

* cited by examiner

*Primary Examiner* — Kristen C Hayes
(74) *Attorney, Agent, or Firm* — Brennan, Manna & Diamond, LLC

(57) ABSTRACT

An expandable step system designed to replace traditional step ladders, makeshift stools, and similar devices for reaching elevated locations. The step system includes a frame that includes a plurality of steps, each step is configured to be raised vertically using a scissor system wherein the steps form ladder steps enabling a user to stand on the steps to reach elevated locations. The step system is stored at the bottom of a cabinet when not in use and can be pulled out of the cabinet by applying a slight force on the front surface thereof, wherein the force pushes the push latches positioned on the rear surface of the system. The system can be made in any size and weight limit and can be installed under one or multiple cabinets in a kitchen area.

13 Claims, 6 Drawing Sheets

EXPANDABLE STEP SYSTEM

CROSS-REFERENCE TO RELATED APPLICATION

The present application claims priority to, and the benefit of, U.S. Provisional Application No. 63/491,366, which was filed on Mar. 21, 2023, and is incorporated herein by reference in its entirety.

FIELD OF THE INVENTION

The present invention generally relates to the field of step devices for reaching elevated locations. More specifically, the present invention relates to a novel expandable step system that includes a two- to three-step stair assembly that can be expanded or closed when pressure is applied via a small kick. The step system can be stored in a small drawer or at the base of any cabinet. Accordingly, the present disclosure makes specific reference thereto. Nonetheless, it is to be appreciated that aspects of the present invention are also equally applicable to other like applications, devices, and methods of manufacture.

BACKGROUND

By way of background, individuals commonly store different items in elevated drawers, cabinets, and other high places in households and workplaces. However, accessing these elevated items can be challenging for individuals. To access such items, individuals often resort to different methods to overcome this difficulty. Generally, individuals ask for assistance from others who can reach the elevated items. However, relying on others for help may not always be convenient or feasible, especially in situations where immediate access to the item is required.

Many individuals use a step ladder or a makeshift stool to reach the elevated items independently. However, the use of such devices is not safe as ladders and stools can be unstable, leading to potential accidents such as slips and falls. The risk of tilting or collapsing increases if the ladder or stool is not properly secured or if it is used on uneven surfaces. Many individuals use chairs to reach elevated storage spaces but chairs can easily tip over, causing severe injuries.

Additionally, ladders, stools, or makeshift steps introduce the problem of storage. These objects occupy space when not in use, which can be inconvenient, particularly in small living or working areas. Moreover, alternative solutions like rods or sticks are also not safe for reaching elevated items. These items lack stability and can easily break, leading to accidents and injuries. Individuals desire a device that provides a safe and easy way of reaching items stored in elevated locations.

Therefore, there exists a long-felt need in the art for a step device that allows individuals to safely reach elevated locations in households and workplaces. There is also a long-felt need in the art for a step device that is expandable and can have a plurality of steps enabling individuals to reach elevated locations. Additionally, there is a long-felt need in the art for an expandable step device that eliminates the use of step ladders, makeshift stools, and more for reaching elevated locations. Moreover, there is a long-felt need in the art for a step device that can be stored under the base of a cabinet system for easy storage when not used for reaching elevated locations. Further, there is a long-felt need in the art of a stable and reliable step device that reduces risks of accidents and injuries to individuals while reaching elevated locations in households and workplaces. Furthermore, there is a long-felt need in the art for an expandable step device that can be pulled out from storage spaces by applying pressure with a foot by a user for use. Finally, there is a long-felt need in the art for an expandable step device for improving safety in homes, offices, etc. when reaching for items in elevated locations.

The subject matter disclosed and claimed herein, in one embodiment thereof, comprises an expandable step system for accessing elevated locations in households, business areas, and more. The expandable step system is designed to be stored at the bottom of a cabinet when not in use and can be pulled out for use. The system features a frame having a pair of side channels facilitating the movement of the step system from and to a bottom of the cabinet, a plurality of steps including at least a first step and a second step mounted on the frame, individual scissor systems for raising and collapsing the first step and the second step wherein the steps are raised vertically upwards upon expansion or extension and wherein the second step is configured to move vertically above than the first step, enabling an individual to extend either or both of the first step and the second step to reach elevated locations without the need for additional tools or equipment. The step system can be pulled upon receiving a force on the front surface of the frame enabling the push locks positioned on the rear surface of the frame to release the frame from the bottom of the cabinet.

In this manner, the expandable step system of the present invention accomplishes all of the foregoing objectives and provides users with a multiple-step unit tucked away underneath a cabinet that can be pulled out when an individual is required to reach an elevated location. The steps of the system can be pulled to function like a ladder step for enabling individuals to reach elevated locations. The step system eliminates the need for step stools, small ladders, or chairs to reach items in elevated areas and thus improves safety in homes, offices, and more.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an expandable step system for accessing elevated locations. The expandable step system further comprising a frame having a pair of side channels facilitating the movement of the step system from and to a bottom of a cabinet, a plurality of steps including a first step and a second step mounted on the frame, a scissors mechanism for expanding and collapsing the first step and the second step wherein the steps move vertically upwards upon expansion or extension and wherein the second step is configured to move vertically above than the first step, enabling an individual to extend either or both of the first step and the second step to reach elevated locations without the need for additional tools or equipment.

In a further embodiment, a step system for accessing elevated locations is disclosed. The step system includes a frame configured to be pulled from a bottom of a cabinet, the frame includes a pair of steps, each step can be expanded by either vertical pulling along the side edges or by pressing the top surface thereof, a housing disposed under the steps within the frame for accommodating a steps lift assembly system, the steps lift assembly system includes a scissor system for the second step and a scissor system for the first step, wherein the scissor systems of the first step and the second step are independently and selectively released or actuated vertically, causing the corresponding step to move upwards, and enabling a user to stand on any of the steps to reach elevated locations.

In a further embodiment, the scissor system for raising the steps includes hinged members coupled using a hinge member, wherein the lowest scissor system is attached to the bottom of the frame, and the top scissor system is attached to the bottom surface of the step.

In yet another embodiment, a method for reaching elevated locations in households and business places is described. The method comprising the steps of storing a removable step system at the bottom of a cabinet, the step system includes a pair of steps that can be raised vertically upwards when the step system is pulled out of the bottom of the cabinet; pulling the step system from the cabinet, expanding or raising a first step, raising a second step, standing on one of the steps to reach elevated locations and collapsing the steps after use for storage at the bottom of the cabinet.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
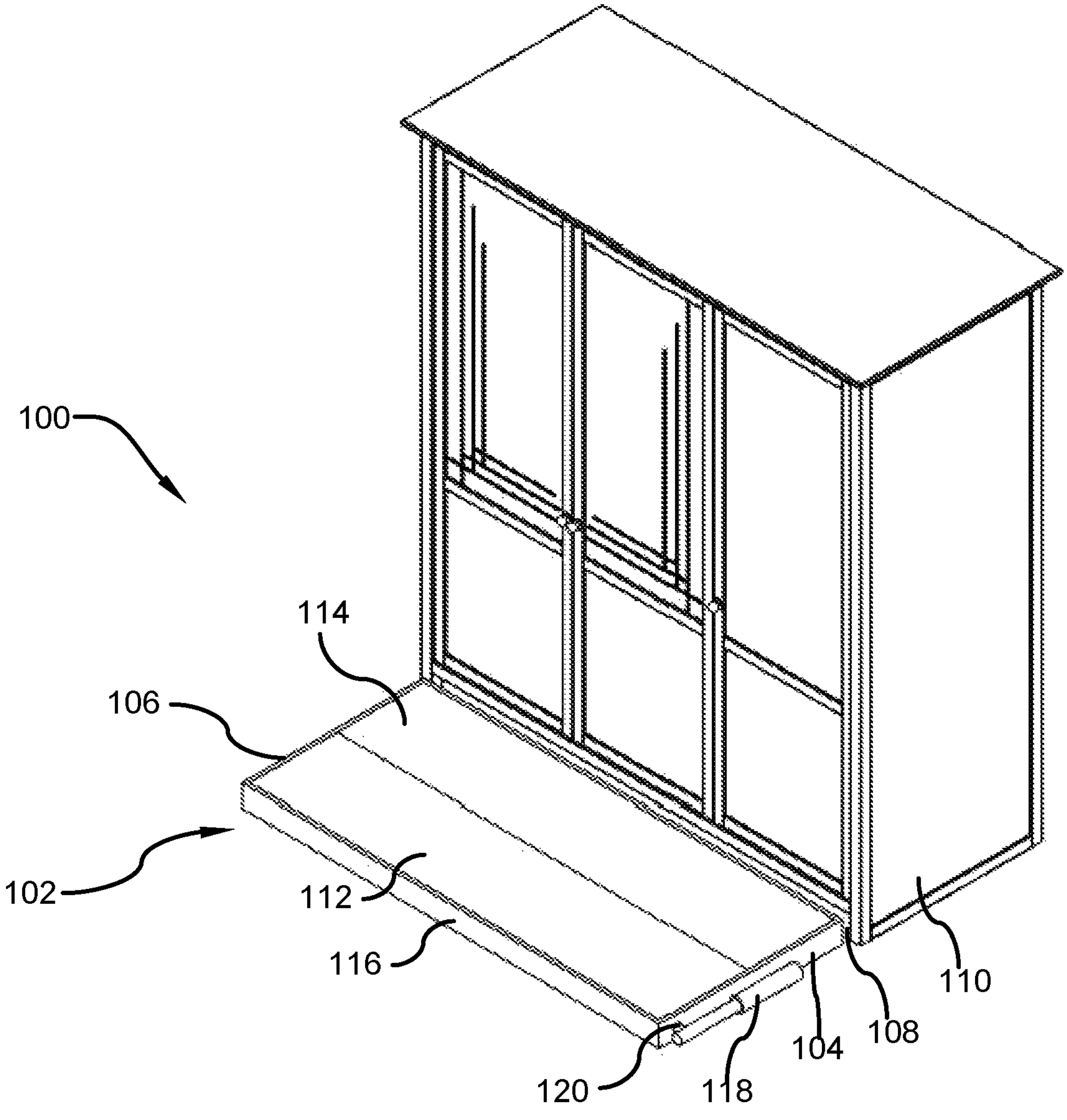
FIG. 1 illustrates a perspective view of the expandable step system of the present invention pulled out of the base of a cabinet in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a step device that allows individuals to safely reach elevated locations in households and workplaces. There is also a long-felt need in the art for a step device that is expandable and can have a plurality of steps enabling individuals to reach elevated locations. Additionally, there is a long-felt need in the art for an expandable step device that eliminates the use of step ladders, makeshift stools, and more for reaching elevated locations. Moreover, there is a long-felt need in the art for a step device that can be stored under the base of a cabinet system for easy storage when not used for reaching elevated locations. Further, there is a long-felt need in the art of a stable and reliable step device that reduces risks of accidents and injuries to individuals while reaching elevated locations in households and workplaces. Furthermore, there is a long-felt need in the art for an expandable step device that can be pulled out from storage space by applying pressure with a foot by a user for use. Finally, there is a long-felt need in the art for an expandable step device for improving safety in homes, offices, etc. when reaching for items in elevated locations.

The present invention, in one exemplary embodiment, is a step system for accessing elevated locations is disclosed. The step system includes a frame configured to be pulled from a bottom of a cabinet, the frame includes a pair of steps, each step can be expanded by either vertical pulling along the side edges or by pressing the top surface thereof, a housing disposed under the steps within the frame for accommodating a steps lift assembly system, the steps lift assembly system includes a scissor system for the second step and a scissor system for the first step, wherein the scissor systems of the first step and the second step are independently and selectively released or actuated vertically, causing the corresponding step to move upwards, and enabling a user to stand on the any of the steps to reach elevated locations.

Referring initially to the drawings, FIG. 1 illustrates a perspective view of the expandable step system of the present invention pulled out of the base of a cabinet in accordance with the disclosed architecture. The expandable step system 100 of the present invention is designed to be used in place of a step ladder, makeshift stool, and other similar devices for reaching elevated locations. More specifically, the step system 100 includes a frame 102 having a pair of side channels 104, 106 for enabling the step system 100 to be easily pulled from and pushed to the bottom or a soft bottom drawer 108 of the cabinet 110. The bottom or a soft bottom drawer 108 of the cabinet 110 can have a receiving frame (not shown) enabling lateral movement of the channels 104, 106.

Figure 2:
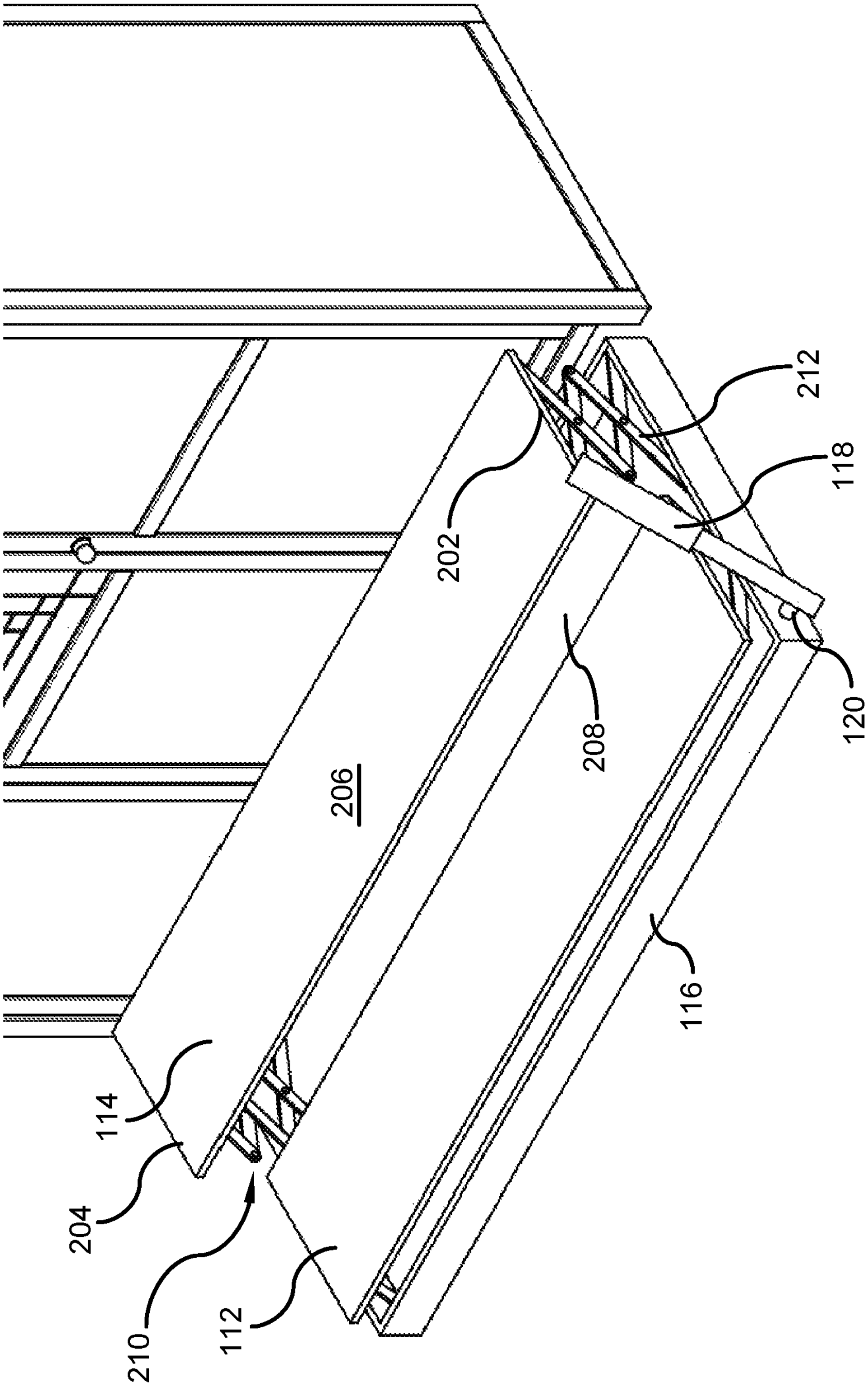
FIG. 2 illustrates a perspective view of the expandable step system with the second step expanded for an individual to reach an elevated location in accordance with the disclosed architecture.
Figure 3:
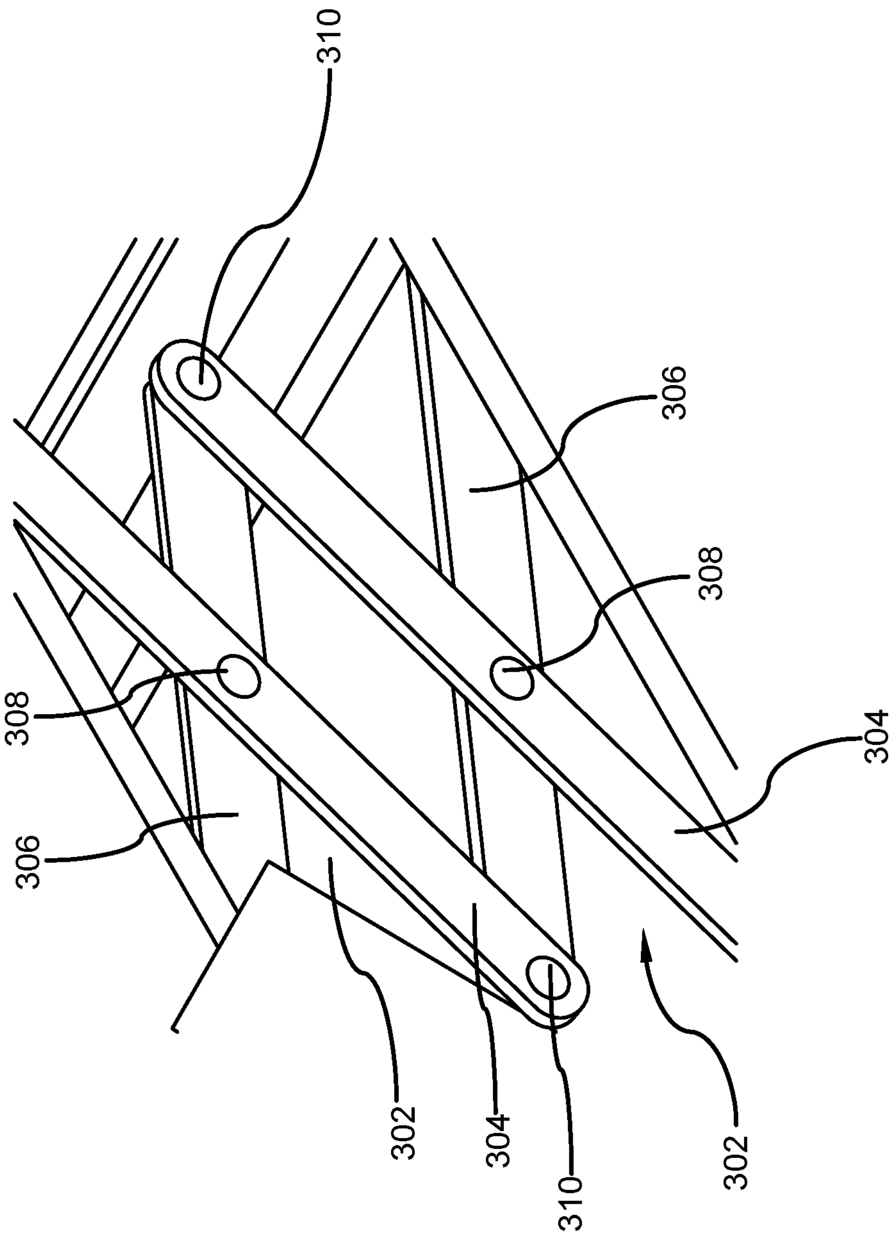
FIG. 3 illustrates an enlarged view of a scissor system used in the expandable step system of the present invention in accordance with the disclosed architecture.
Figure 4:
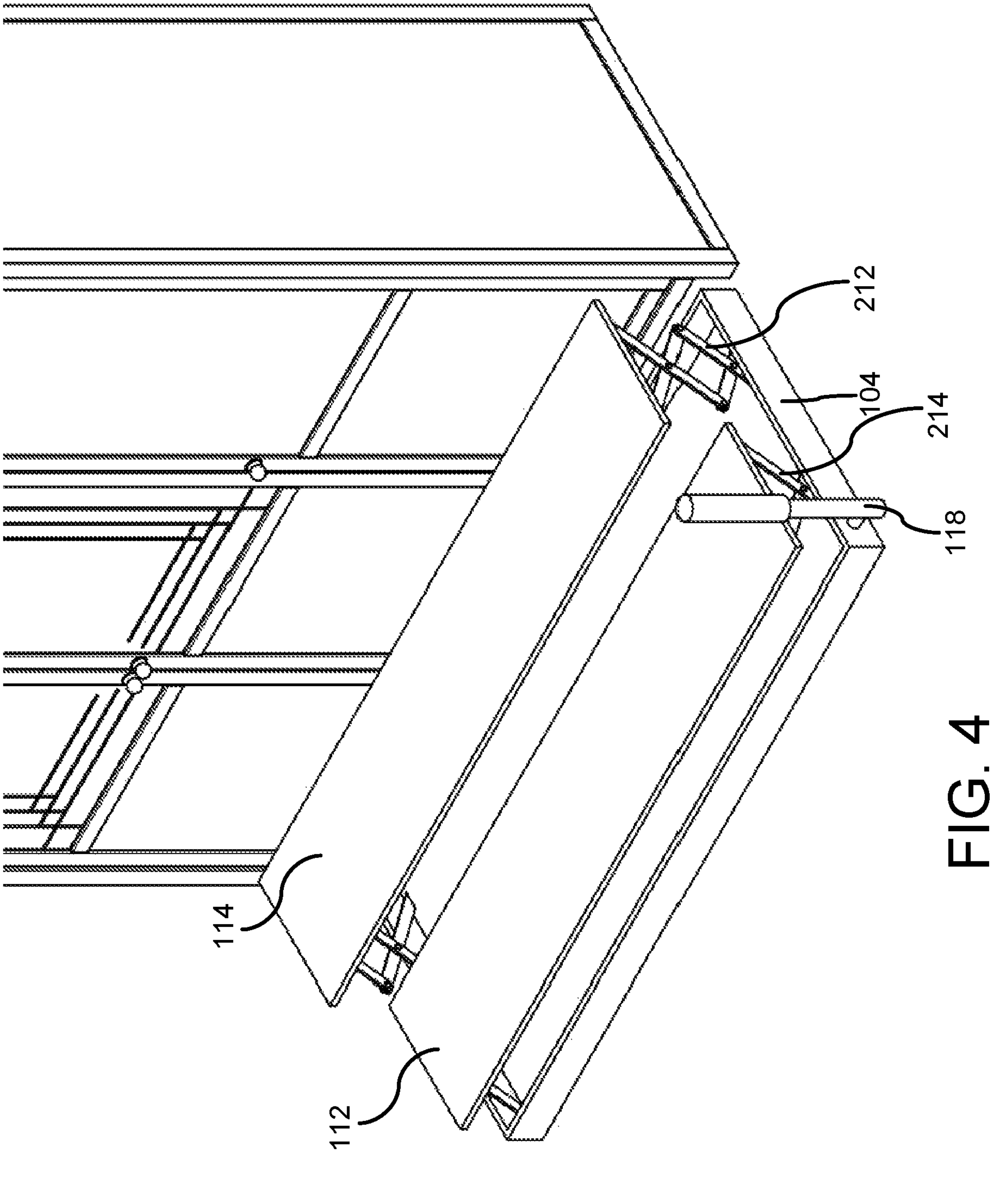
FIG. 4 illustrates a perspective view of the expandable step system of the present invention in an expanded form in accordance with the disclosed architecture.
Figure 5:
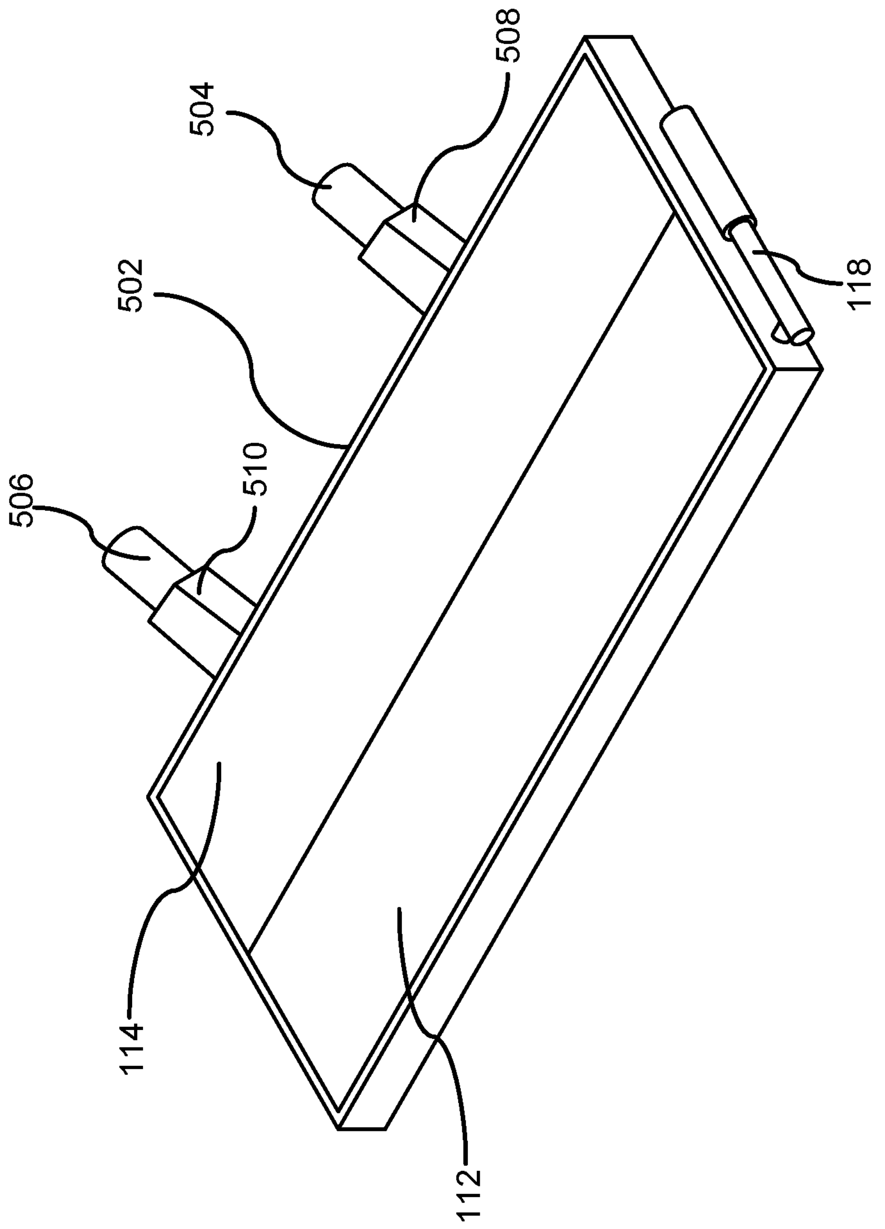
FIG. 5 is an isolated view of the expandable step system of the present invention in a collapsed state in accordance with the disclosed architecture.

The step system 100 includes a first step 112 and a second step 114 wherein the frame 102 includes a scissors mechanism as shown in FIGS. 2-4 for expanding and collapsing the steps 112, 114. An individual can expand one or both the steps 112, 114 for reaching elevated locations without using a ladder, stools, and other similar devices. For pulling or pushing the step system 100 from the cabinet 110, an individual can push (such as by kicking) the front surface 116 of the expandable multiple steps device 100 for actuating the push latches disposed on the rear surface of the step system 100 as illustrated in FIG. 5.

A pivoting member 118 is disposed along one of the channels, such as the channel 104 that helps in expanding and collapsing the individual steps 112, 114. The pivoting member 118 pivots along the pivoting pin 120 for expanding and stabilizing the steps 104, 106. The step system 100 can be manufactured in different sizes to accommodate at bottom of different cabinets. Further, in some embodiments, the step system 100 can be pushed and pulled without requiring the receiving frame at the bottom of the cabinet 110, thereby enabling installation and use of the step system 100 with existing cabinets having an accommodating space at the bottom thereof. The expandable step system 100 can be made of any durable material such as wood, metal, plastic, and more.

FIG. 2 illustrates a perspective view of the expandable step system with the second step 114 expanded for an individual to reach an elevated location in accordance with the disclosed architecture. Once, the step system 100 is pulled from the bottom 108 of the cabinet 110, the second step 114 can be expanded by either pulling vertically upwards while holding the second step 114 along the side edges 202, 204 or alternatively can be expanded by slightly pressing the top surface 206 thereof. The top surface 206 is pressed when the second step 114 is in a collapsed position as illustrated in FIG. 1. While the second step 114 expands to be in an expanded or raised position (shown in FIG. 2), the pivoting member 118 pivots along the pivoting pin 120 to support and stabilize the first and second steps 112, 114 in the raised positions.

Referring to FIGS. 2 and 3, the frame 102 of the step system 100 includes a housing 208 disposed under the steps 112, 114 for accommodating steps lift assembly system 210 for individual steps 112, 114. When the second step 114 expands, the scissor system 212 of the second step 114 is released or actuated vertically to move the second step 114 upwards. The steps lift assembly system 210 includes the scissors system 212 of the second step 114 and the scissors system 214 of the first step 112 as illustrated in FIG. 4. It is to be appreciated that the height of extension of the scissor system 212 is greater than a height of extension of the scissor system 214.

FIG. 3 illustrates an enlarged view of a scissor system used in the expandable step system of the present invention in accordance with the disclosed architecture. The scissor system 212 of the second step 114 is taken as an example in the present embodiment and it should be noted that the same mechanism can be used in the scissor system 214 of the first step 112. The scissor system 212 includes a plurality of scissor lever members 302 and each scissor lever member 302 includes a front member 304 and a rear member 306. The front member 304 and the rear member 306 of individual scissor lever member 302 are hinged together using a central hinge member 308 positioned around the middle of the members 304, 306 to position the members 304, 306 in an X-shape.

The front member of one scissor lever member is also hinged to the rear member of the preceding scissor member and the subsequent scissor member using the hinge member 310 to form a scissor or accordion formation. The lowest scissor lever member 302 is attached to the bottom surface of the frame 102 of the step assembly 100 and the top scissor lever member 302 is attached to the bottom surface of the second step 114. The scissor system 212 of the second step 114 expands using the hinge members 308 to expand the second step 302 wherein the members 304, 306 are configured to slide relative to each other to expand and collapse the second step 114. It should be noted that the number of the scissor lever member 302 can be increased or decreased based on the expansion of the second step 114 required by users.

FIG. 4 illustrates a perspective view of the expandable step system of the present invention in an expanded form in accordance with the disclosed architecture. As illustrated, the first step 112, and the second step 114 are in the expanded form with the scissor systems 212, 214 in an extended form. The number of the scissor lever member 302 in the scissor system 214 of the first step 112 are less (preferably by one) enabling an appropriate vertical difference between the steps 112, 114.

In the expansion state, the pivoting member 118 becomes vertically aligned while being attached to the side channel 104. A user can easily step on the first step 112 and then on the second step 114 for enabling access to elevated storage spaces and locations. In the expanded state, the steps 112, 114 are locked, thereby preventing the steps 112, 114 from being collapsed automatically. In the preferred embodiment, the steps 112, 114 are collapsed when the hinge members 308 are pushed, to release the tension in the members 304, 306.

FIG. 5 is an isolated view of the expandable step system of the present invention in a collapsed state in accordance with the disclosed architecture. In the collapsed state, the steps 112, 114 are coplanar within the frame 102. The frame 102 has a pair of push latches 504, 506 attached to the rear surface 502 thereof wherein during installation of the step system 100, the push latches 504, 506 touches the rear surface (not shown) of the cabinet 110 of FIG. 1 in which the expandable multiple steps device 100 is positioned in the collapsed state.

As described in FIG. 1, an individual kicks or pushes the front surface 106 of the frame 102 for ejecting or pulling the step system 100 from the bottom or a soft bottom drawer 108 of the cabinet 110. Upon pushing the front surface 106, the push latches 504, 506 are pressed against the cabinet 110 and retracts into the housings 508, 510 respectively, for pulling the step system 100 out of the cabinet 110 for use as illustrated in FIGS. 1, 2, and 4.

In some of the embodiments of the present invention, push latches can be positioned in the cabinet and not on the rear surface 502 of the frame 102. In such embodiments, the rear surface 502 pushes against the push latches for pulling the step system 100 out of the cabinet 110.

Figure 6:
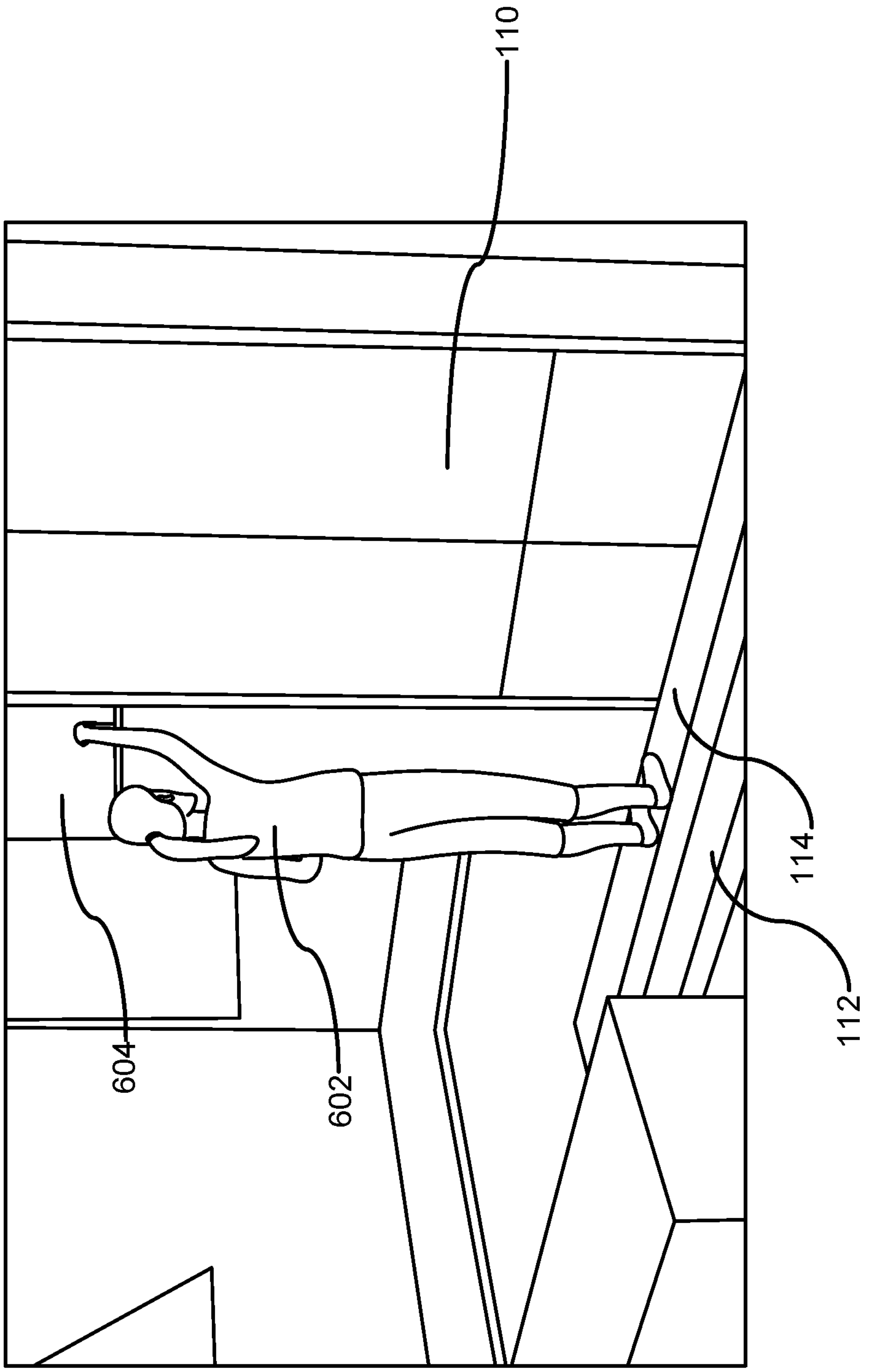
FIG. 6 illustrates a user standing on the second step of the expandable step system of the present invention for reaching an elevated location in accordance with the disclosed architecture.

FIG. 6 illustrates a user standing on the second step of the expandable step system of the present invention for reaching an elevated location in accordance with the disclosed architecture. As illustrated, a user 602 stands on the step 114 for reaching elevated location 604. Based on requirements and user preferences, the user 602 can stand on any of the steps 112, 114 without requiring the user 602 to use any ladder, stool, or other devices. The step system 100 can be pushed back under the cabinet 110 after use, thereby eliminating the need of separately storing the steps system 100.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "expandable step system", "step system", "step assembly", "expandable step device", and "system" are interchangeable and refer to the expandable multiple steps device 100 of the present invention.

Notwithstanding the foregoing, the expandable multiple steps device 100 of the present invention can be of any suitable size and configuration as is known in the art without affecting the overall concept of the invention, provided that it accomplishes the above-stated objectives. One of ordinary skill in the art will appreciate that the expandable multiple steps device 100 as shown in the FIGS. are for illustrative purposes only, and that many other sizes and shapes of the expandable multiple steps device 100 are well within the scope of the present disclosure. Although the dimensions of the expandable multiple-step device 100 are important design parameters for user convenience, the expandable multiple steps device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An expandable step system for reaching elevated locations, the expandable step system comprising:
- a frame with a front surface and a rear surface including a pair of push latches;
- a first step with a first scissors mechanism;
- a second step with a second scissors mechanism; and
- a pair of side channels for said step system to be pulled from and pushed to a bottom drawer of a cabinet;
- wherein said bottom drawer having a receiving frame for lateral movement of said pair of side channels;

- wherein said first scissors mechanism expands and collapses said first step and said second scissors mechanism expands and collapses said second step;
- wherein said front surface engageable by a user's foot for actuating said pair of push latches and deploying said step system from the cabinet;
- wherein actuating said pair of push latches includes pushing said front surface; and
- further wherein at least one of said pair of side channels having a pivoting member for manually expanding and collapsing said first step and said second step.

2. The expandable step system of claim 1, wherein said pivoting member having a pivoting pin connected to at least one of said first scissors mechanism and said second scissors mechanism.

3. The expandable step system of claim 2, wherein said first step and said second step are coplanar within said frame when said first step and said second step are collapsed.

4. The expandable step system of claim 3, wherein said first scissors mechanism having a first extension height and said second scissors mechanism having a second extension height, and further wherein said second extension height greater than said first extension height.

5. The expandable step system of claim 4, wherein said pivoting pin secures said first scissors mechanism at said first extension height and said second scissors mechanism at said second extension height.

6. An expandable step system for reaching elevated locations, the expandable step system comprising:
- a frame with a front surface and a rear surface including a pair of push latches;
- a first step with a first scissors mechanism;
- a second step with a second scissors mechanism; and
- a pair of side channels for said step system to be pulled from and pushed to a bottom drawer of a cabinet;
- wherein said bottom drawer having a receiving frame for lateral movement of said pair of side channels;
- wherein said first scissors mechanism expands and collapses said first step and said second scissors mechanism expands and collapses said second step;
- wherein said first step and said second step are coplanar within said frame when said first step and said second step are collapsed;
- wherein said front surface engageable by a user's foot for actuating said pair of push latches and deploying said step system from the cabinet;
- wherein actuating said pair of push latches includes pushing said front surface; and
- further wherein at least one of said pair of side channels having a pivoting member for manually expanding and collapsing said first step and said second step.

7. The expandable step system of claim 6, wherein said pivoting member having a pivoting pin connected to at least one of said first scissors mechanism and said second scissors mechanism.

8. The expandable step system of claim 7, wherein said first scissors mechanism having a first extension height and said second scissors mechanism having a second extension height, and further wherein said second extension height greater than said first extension height.

9. The expandable step system of claim 8, wherein said pivoting pin secures said first scissors mechanism at said first extension height and said second scissors mechanism at said second extension height.

10. An expandable step system for reaching elevated locations, the expandable step system comprising:

a frame with a front surface and a rear surface including a pair of push latches;

a first step with a first scissors mechanism;

a second step with a second scissors mechanism; and a pair of side channels for said step system to be pulled from and pushed to a bottom drawer of a cabinet;

wherein said bottom drawer having a receiving frame for lateral movement of said pair of side channels;

wherein said first scissors mechanism expands and collapses said first step and said second scissors mechanism expands and collapses said second step;

wherein said front surface engageable by a user's foot for actuating said pair of push latches and deploying said step system from the cabinet;

wherein at least one of said pair of side channels having a pivoting member for manually expanding and collapsing said first step and said second step;

wherein said pivoting member having a pivoting pin connected to said first scissors mechanism and said second scissors mechanism; and further wherein said pivoting pin secures said first scissors mechanism at a first extension height and said second scissors mechanism at a second extension height.

11. The expandable step system of claim 10, wherein actuating said pair of push latches includes pushing said front surface.

12. The expandable step system of claim 10, wherein said second extension height greater than said first extension height.

13. The expandable step system of claim 10, wherein said first step and said second step are coplanar within said frame when said first step and said second step are collapsed.

* * * * *